US007158257B2

(12) United States Patent
Hosoda

(10) Patent No.: US 7,158,257 B2
(45) Date of Patent: Jan. 2, 2007

(54) INFORMATION PROCESSING APPARATUS, IMAGE PROCESSING METHOD, AND PROGRAM

(75) Inventor: Yasuhiro Hosoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/960,114

(22) Filed: Oct. 8, 2004

(65) Prior Publication Data

US 2005/0088681 A1 Apr. 28, 2005

(30) Foreign Application Priority Data

Oct. 14, 2003 (JP) ............................. 2003-353745

(51) Int. Cl.
*G06F 3/12* (2006.01)
(52) U.S. Cl. ..................... 358/1.15; 358/1.1; 710/15; 710/16; 710/17; 710/18; 710/19
(58) Field of Classification Search ................ 358/1.1, 358/1.15; 710/15–19
See application file for complete search history.

(56) References Cited

U.S. PATENT DOCUMENTS

| 5,859,956 | A * | 1/1999 | Sugiyama et al. ......... 358/1.13 |
| 6,631,008 | B1 * | 10/2003 | Aoki ........................ 358/1.15 |
| 6,940,615 | B1 * | 9/2005 | Shima ....................... 358/1.15 |
| 2001/0013053 | A1 * | 8/2001 | Yamazaki .................. 709/203 |
| 2003/0133146 | A1 * | 7/2003 | Parry ........................ 358/1.15 |
| 2004/0036908 | A1 * | 2/2004 | Yagita et al. .............. 358/1.15 |
| 2004/0190042 | A1 * | 9/2004 | Ferlitsch et al. ........... 358/1.15 |
| 2005/0030574 | A1 * | 2/2005 | McVey et al. ............. 358/1.14 |

FOREIGN PATENT DOCUMENTS

| JP | 07-121327 | 5/1995 |
| JP | 09-034660 | 2/1997 |
| JP | 09-190312 | 7/1997 |
| JP | 9-319533 A | 12/1997 |
| JP | 11-203078 | 7/1999 |
| JP | 11-353140 A | 12/1999 |
| JP | 2001-125762 | 5/2001 |
| JP | 2001-290630 | 10/2001 |
| JP | 2003-084942 | 3/2003 |
| JP | 2003-271331 | 9/2003 |

\* cited by examiner

Primary Examiner—Twyler Lamb
Assistant Examiner—Yixing Qin
(74) Attorney, Agent, or Firm—Fitzpatrick, Cella, Harper & Scinto

(57) ABSTRACT

In an information processing apparatus capable of communicating with plural image processing apparatuses, the image processing apparatus satisfying a desired condition input by a user is selected from among the plural image processing apparatuses, the selected one or more image processing apparatuses are stored in a storage means, and it causes any one of the stored image processing apparatuses to perform an image process. When the image processing apparatus in question cannot continue the image process, it causes any one of the image processing apparatuses stored in the storage means and satisfying the above condition to perform a substitute process.

7 Claims, 17 Drawing Sheets

FIG. 3

SETTING OF PRINTER

| PRINTER NAME | ADDRESS |
|---|---|
| DOUBLE-SIDED PRINT | 123.123.4.5 |
| A3 DOUBLE-SIDED PRINT | 123.123.4.6 |
| COLOR 4 UP | 123.123.4.8 |

301 — DOUBLE-SIDED PRINT
302 — A3 DOUBLE-SIDED PRINT
303 — ADDRESS

[ REGISTER ]  [ EDIT ]  [ DELETE ]  [ STRUCTURE ]

[ OK ]  [ CANCEL ]

FIG. 4

REGISTRATION OF PRINTER

PRINTER NAME: DOUBLE-SIDED PRINT  (401)

PRINTER ATTRIBUTE (402):
DOUBLE-SIDED PRINT
REMAINING PAPER AMOUNT 100
PRINT SPEED 20ppm

[ BACK ]  [ NEXT ]  [ CANCEL ]

FIG. 5

REGISTRATION OF PRINTER

PRINTER NAME: DOUBLE-SIDED PRINT — 501

| PRINTER ATTRIBUTE | PRIORITY ORDER |
|---|---|
| DOUBLE-SIDED PRINT | 1 — 502 |
| REMAINING PAPER AMOUNT 100 | 3 |
| PRINT SPEED 20ppm | 2 |

[ BACK ] [ NEXT — 503 ] [ CANCEL ]

FIG. 6

REGISTRATION OF PRINTER

PRINTER NAME: DOUBLE-SIDED PRINT — 601
IP ADDRESS: 123.123.4.5 ▼ — 602, 604

[ BACK ] [ OK — 603 ] [ CANCEL ]

FIG. 8A

| PRINTER NAME | | ATTRIBUTE 1 | ATTRIBUTE 2 | ATTRIBUTE 3 |
|---|---|---|---|---|
| DOUBLE-SIDED PRINT | ATTRIBUTE NAME | DOUBLE-SIDED PRINT | PRINT SPEED | REMAINING PAPER AMOUNT |
| | PRIORITY | 1 | 2 | 3 |
| | REFERENCE VALUE | NONE | 20ppm | 100 |

| PRINTER NAME | | ATTRIBUTE 1 | ATTRIBUTE 2 | ATTRIBUTE 3 | ATTRIBUTE 4 |
|---|---|---|---|---|---|
| A3 DOUBLE-SIDED PRINT | ATTRIBUTE NAME | DOUBLE-SIDED PRINT | A3 | REMAINING PAPER AMOUNT | PRINT SPEED |
| | PRIORITY | 1 | 1 | 2 | 3 |
| | REFERENCE VALUE | NONE | NONE | 50 | 10ppm |

FIG. 8C

| PRINTER NAME | | ATTRIBUTE 1 | ATTRIBUTE 2 | ATTRIBUTE 3 | ATTRIBUTE 4 |
|---|---|---|---|---|---|
| COLOR 4 UP | ATTRIBUTE NAME | COLOR PRINT | 4 IN 1 | REMAINING PAPER AMOUNT | PRINT SPEED |
| | PRIORITY | 1 | 1 | 2 | 3 |
| | REFERENCE VALUE | NONE | NONE | 10 | 7ppm |

FIG. 9

| PRINTER NAME | PRIORITY ORDER | ADDRESS | ATTRIBUTE 1 | ATTRIBUTE 2 | ATTRIBUTE 3 | ATTRIBUTE 4 |
|---|---|---|---|---|---|---|
| DOUBLE-SIDED PRINT | 1 | 123.123.4.5 | DOUBLE-SIDED PRINT | 60ppm | 200 | |
| | 2 | 123.123.4.6 | DOUBLE-SIDED PRINT | 50ppm | 500 | |
| | 3 | 123.123.4.7 | DOUBLE-SIDED PRINT | 30ppm | 100 | |
| A3 DOUBLE-SIDED PRINT | 1 | 123.123.4.6 | DOUBLE-SIDED PRINT | A3 | 500 | 50ppm |
| | 2 | 123.123.4.5 | DOUBLE-SIDED PRINT | A3 | 200 | 60ppm |
| | 3 | 123.123.4.8 | DOUBLE-SIDED PRINT | A3 | 50 | 10ppm |
| COLOR 4 UP | 1 | 123.123.4.8 | COLOR PRINT | 4 IN 1 | 300 | 10ppm |
| | 2 | 123.123.4.9 | COLOR PRINT | 4 IN 1 | 200 | 12ppm |

FIG. 10

```
EDITING OF PRINTER
  PRINTER NAME        [ DOUBLE-SIDED PRINT ]

PRINTER ATTRIBUTE
                      DOUBLE-SIDED PRINT
                      REMAINING PAPER AMOUNT 100
                      PRINT SPEED 20ppm

[ BACK ]   [ OK ]   [ CANCEL ]
```

FIG. 11

```
EDITING OF PRINTER
  PRINTER NAME        [ DOUBLE-SIDED PRINT ]

PRINTER ATTRIBUTE          PRIORITY ORDER

DOUBLE-SIDED PRINT            [ 1 ]

REMAINING PAPER AMOUNT 100    [ 3 ]

PRINT SPEED 20ppm             [ 2 ]

[ BACK ]   [ NEXT ]   [ CANCEL ]
```

FIG. 16

STRUCTURE OF PRINTER

PRINTER NAME: DOUBLE-SIDED PRINT

| ORDER | ADDRESS | ATTRIBUTE 1 | ATTRIBUTE 2 |
|---|---|---|---|
| 1 | 123.123.4.5 | DOUBLE-SIDED PRINT | 60ppm |
| 2 | 123.123.4.6 | DOUBLE-SIDED PRINT | 50ppm |
| 3 | 123.123.4.7 | DOUBLE-SIDED PRINT | 30ppm |

1601 — SUBSTITUTE PRINT CONDITION

OK    CANCEL

FIG. 17

SETTING OF SUBSTITUTE PRINT

CONDITION FOR SUBSTITUTE PRINT

☑ OUT OF PAPER    ☑ COVER/DOOR OPEN

☑ PAPER JAM    ☑ TRAY FULL LOAD

OK    CANCEL

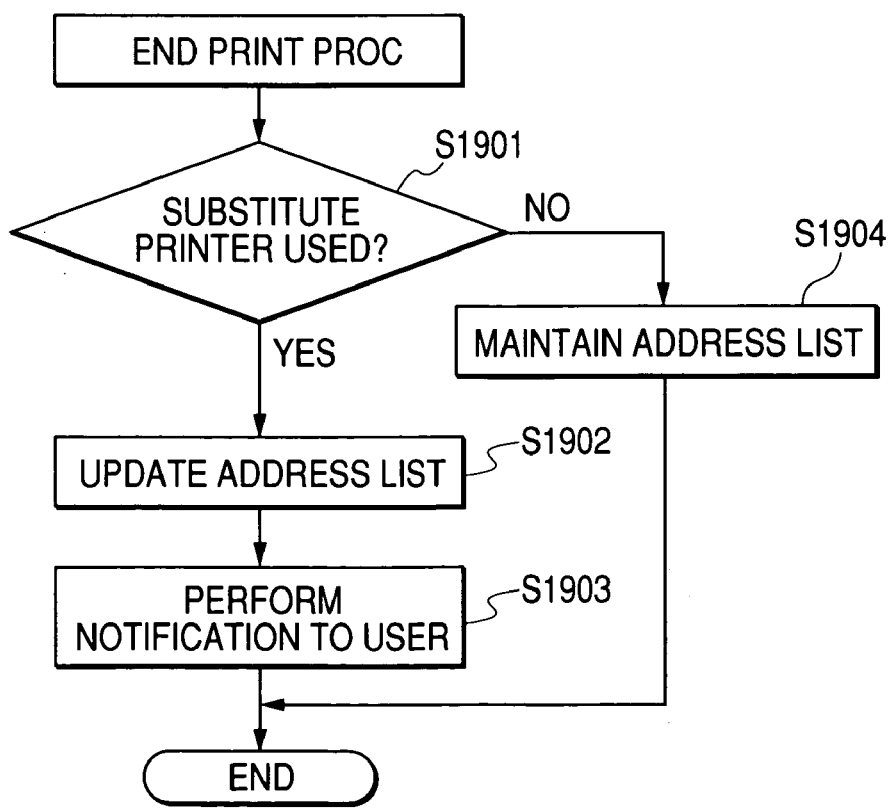

FIG. 20

| STRUCTURE OF PRINTER | | | |
|---|---|---|---|
| PRINTER NAME | DOUBLE-SIDED PRINT | | |
| ORDER | ADDRESS | ATTRIBUTE 1 | ATTRIBUTE 2 |
| 1 | 123.123.4.5 | DOUBLE-SIDED PRINT | 60ppm |
| 2 | 123.123.4.6 | DOUBLE-SIDED PRINT | 50ppm |
| 3 | 123.123.4.7 | DOUBLE-SIDED PRINT | 30ppm |

SUBSTITUTE PRINT CONDITION    DISTRIBUTION RATIO — 2001

OK    CANCEL

FIG. 21

| SETTING OF DISTRIBUTION RATIO | | |
|---|---|---|
| PRINTER NAME | DOUBLE-SIDED PRINT | |
| ORDER | ADDRESS | DISTRIBUTION RATIO |
| 1 | 123.123.4.5 | 1 |
| 2 | 123.123.4.6 | 1 |
| 3 | 123.123.4.7 | 1 |

OK    CANCEL

INFORMATION PROCESSING APPARATUS, IMAGE PROCESSING METHOD, AND PROGRAM

BACKGROUND OF THE INVENTION

1. Field of the Invention

The present invention relates to an information processing apparatus capable of communicating with an image processing apparatus on a network, a communication method of enabling the information processing apparatus to communicate with the image processing apparatus on the network, and a program for executing the communication method.

2. Related Background Art

There is a technique that plural computers share, through a network, network devices such as a printer, a copying machine and the like respectively provided on the network. In this technique, for example, when a user intends to use the printer among the plural devices provided on the network, it is necessary for the user to make a search for the printer which has a desired function (e.g., a color print function, a double-sided print function, or the like). However, for example, in a case where a network system is large in scale and thus a number of printers are interconnected, it is difficult for the user oneself to previously gain an understanding of the functions, the locations and the like of all of these printers.

Consequentially, Japanese Patent Application Laid-Open No. H11-353140 discloses technique that a user designates desired printer attribute information (e.g., color print information, double-sided print information, or the like), the printer satisfying the designated printer attribute information is searched (or retrieved) from the network, and the searched printer is displayed, thereby eliminating a troublesome that the user oneself has to search a desired printer.

Besides, as technique for effectively using plural printers existing on the network, there is distribution printing that one print job is distributed to the plural printers existing on the network, and the distributed jobs are respectively output by these printers. Moreover, there is substitute printing that, in a case where printing became impossible due to some kind or another error occurred in the printer registered as an output destination, another printer on the network performs the printing in question as a substitute for the registered printer. In any case, a setting process for the printer intended to perform the distribution printing is necessary when the distribution printing is to be performed, and a setting process for the printer intended to perform the substitute printing is necessary when the substitute printing is to be performed.

Here, as a method of performing the setting process, Japanese Patent Application Laid-Open No. H09-319533 discloses a method that a virtual printer is beforehand created by selecting and grouping printers with characteristics that a user desires from among physical printers connected and usable on the network at that time, and, in case of performing printing, the created virtual printer is selected, and the physical printers included in the selected virtual printer are actually used so that output data is automatically distributed to the optimum printers with the characteristic that the user desires, thereby achieving distribution printing.

By using the above technique, the user can easily find out the printer with the desired function from among the plural printers connected on the network. At this time, when the plural results are retrieved, one of the retrieved results is selected and registered as the usable printer.

However, in the above print methods such as the distribution print method, the substitute print method and the like that the plural printers are used for printing, it is necessary beforehand to retrieve the plural printers connected on the network, find out the printer with the desired function, and register the found printer as the currently usable printer. Then, it is necessary to select the desired printer and again register it as a distribution-destination printer, a substitute-destination printer or the like. For this reason, it is necessary for the user to doubly perform the complicated processes such as the printer retrieval process and the printer registration process.

SUMMARY OF THE INVENTION

The present invention has been made in consideration of the above conventional problems, and an object of the present invention is to provide an information processing apparatus which can reduce a load necessary for printer setting in print methods such as a distribution print method, a substitute print method and the like that plural printers are used, a communication method which is used for the information processing apparatus, and a program which is used to perform the communication program.

In order to achieve the above object, an information processing apparatus capable of communicating with plural image processing apparatuses, and a method and program therefore, comprises a determination unit adapted to determine a priority order of each of the plural image processing apparatuses; a first selection unit adapted to select, from among the plural image processing apparatuses, a first image processing apparatus of which the priority order determined by the determination unit is high, as the image processing apparatus for executing a first process; a second selection unit, in a case where the first image processing apparatus selected by the first selection unit cannot continue to execute the first process, adapted to select a second image processing apparatus of which the priority order is high next to that of the first image processing apparatus, as the image processing apparatus for substitutively executing the first process; and a change unit adapted to make the priority order of the second image processing apparatus higher than that of the first image processing apparatus according to the completion of the first process by the second image processing apparatus.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiments of the invention and, together with the description, serve to explain the principles of the invention.

FIG. 3 is a diagram showing a printer setting screen to be displayed on a display of the host computer according to the embodiment of the present invention;

FIG. 4 is a diagram showing an example of a printer registration window to be displayed on the display of the host computer according to the embodiment of the present invention;

FIG. 5 is a diagram showing an example of a printer attribute priority setting window to be displayed on the display of the host computer according to the embodiment of the present invention;

FIG. 6 is a diagram showing an example of a printer registration result display window to be displayed on the display of the host computer according to the embodiment of the present invention;

FIGS. 8A, 8B and 8C are diagrams respectively showing examples of printer attribute lists according to the embodiment of the present invention;

FIG. 9 is a diagram showing an example of a printer address list according to the embodiment of the present invention;

FIG. 10 is a diagram showing an example of a printer editing window to be displayed on the display of the host computer according to the embodiment of the present invention;

FIG. 11 is a diagram showing an example of the printer attribute priority setting window to be displayed in case of printer editing on the display of the host computer according to the embodiment of the present invention;

FIG. 16 is a diagram showing an example of a substitute print condition button to be displayed on the display of the host computer according to the embodiment of the present invention;

FIG. 17 is a diagram showing an example of a substitute print condition setting window to be displayed on the display of the host computer according to the embodiment of the present invention;

FIG. 18 is a diagram showing an example of a print error notification window to be displayed on the display of the host computer according to the embodiment of the present invention;

FIG. 19 is a flow chart showing an address list post-process to be performed after the substitute print process according to the embodiment of the present invention;

FIG. 20 is a diagram showing an example of a distributed ratio setting button to be displayed on the display of the host computer according to the embodiment of the present invention; and FIG. 21 is a diagram showing an example of a distributed ratio setting window to be displayed on the display of the host computer according to the embodiment of the present invention.

DETAILED DESCRIPTION OF THE PREFERRED EMBODIMENTS

Hereinafter, the embodiment of the present invention will be explained in detail with reference to the attached drawings.

Figure 1:
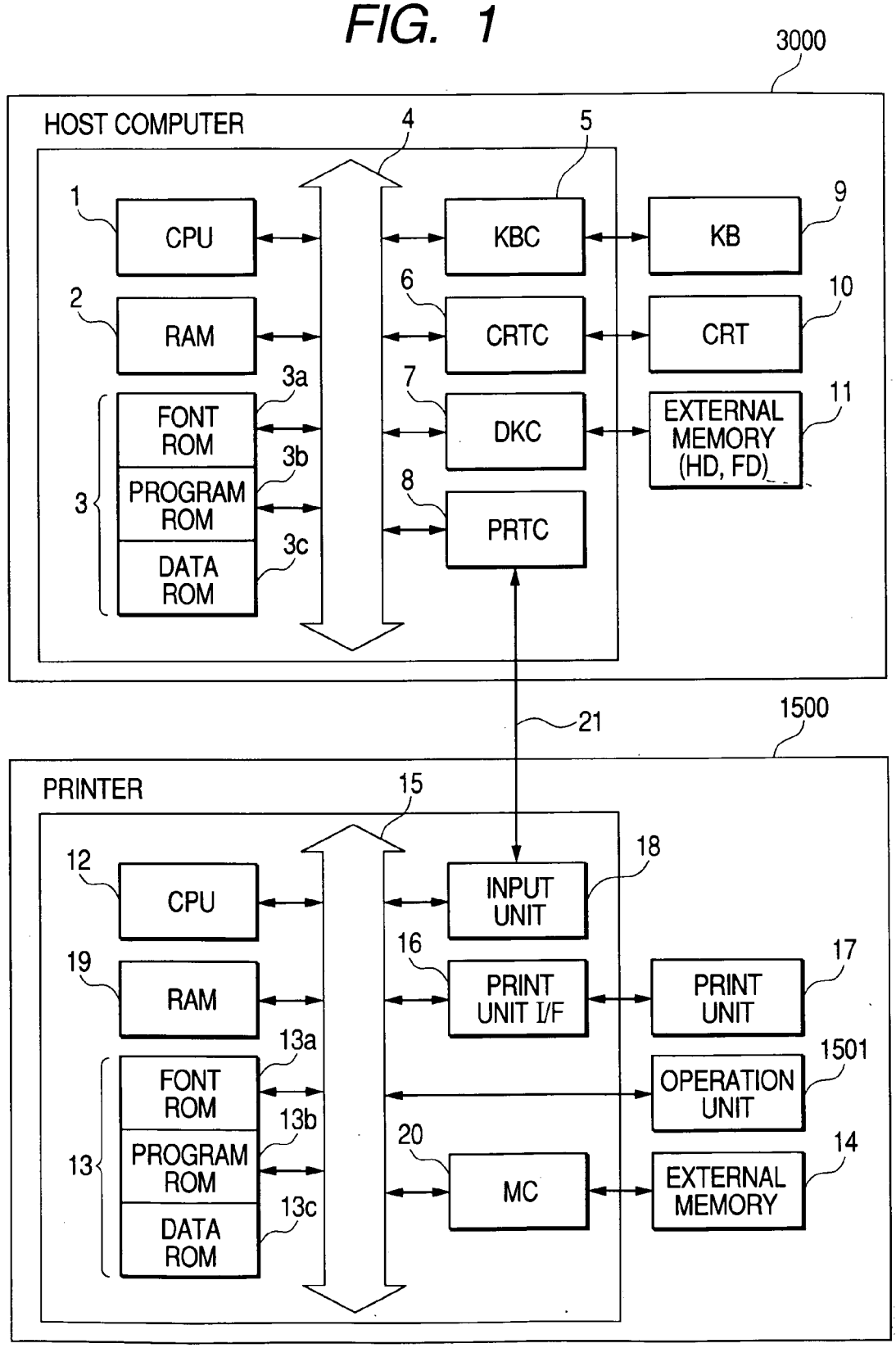
FIG. 1 is a block diagram showing the hardware structures of a host computer and a printer according to the embodiment of the present invention.

Initially, the structures of a print system according to the embodiment of the present invention will be explained with reference to FIG. 1. Here, it should be noted that, in the embodiment, an information processing apparatus is a host computer and an image processing apparatus is a printer.

Moreover, in the embodiment, the print system is explained by way of example. However, the present invention is not limited to this. That is, the present invention is also applicable to a copy system, a scan system or the like in a case where the printer acting as the image processing apparatus in the embodiment is replaced with a copying machine, a scanner, a multifunctional machine or the like.

The print system according to the embodiment is composed of a host computer 3000 and a printer 1500. Here, the host computer 3000 is equipped with a CPU 1, a RAM 2, a ROM 3, a KBC (keyboard controller) 5, a CRTC (CRT controller) 6, a DKC (disk controller) 7, a PRTC (printer controller) 8, a KB (keyboard) 9, a CRT (CRT display) 10, and an external memory 11.

First, the structure of the host computer 3000 will be explained in detail. The CPU 1 is the central processing unit which totally controls respective devices connected to a system bus 4. The CPU 1 executes a document (or text) process to mixedly handle figures, images, characters, tables (including spreadsheets or the like) and the like on the basis of document processing program stored in a program ROM 3b (later described) of the ROM 3 or the external memory 11. Moreover, the CPU 1 executes, e.g., an expansion (rasterizing) process of an outline font onto a display information RAM set on the RAM 2, and enables WYSIWYG (what you see is what you get) editing on the CRT 10 so that an image displayed on the display CRT screen can be printed as it is (i.e., unchanged size and shape).

Further, the CPU 1 opens various registered windows in response to a command indicated and issued by using a not-shown mouse cursor or the like on the CRT 10, and thus executes various data processes. Thus, in case of printing various images by using the printer 1500, the user opens the window concerning the print setting and performs the print method setting for a printer driver, such as the setting of the printer 1500, print mode selection, and the like.

The RAM 2 functions as a main memory, a working area and the like of the CPU 1, and the ROM 3 includes a font ROM 3a, the program ROM 3b and a data ROM 3c. Here, the font ROM 3a or the external memory 11 stores font data or the like to be used in the document process, the program ROM 3b or the external memory 11 stores an OS (operating system) acting as the control program of the CPU 1 or the like, and the data ROM 3c or the external memory 11 stores various data to be used in the above document process and the like.

The KBC 5 controls key inputting from the KB 9 and a pointing device (not shown), the CRTC 6 controls the display operation of the CRT 10, and the DKC 7 controls accessing between the host computer and the printer 1500. The PRTC 8 which is connected to the printer 1500 through a bi-directional interface 21 performs a communication control process to communication between the host computer 3000 and the printer 1500. The KB 9 includes various kinds of keys.

The CRT 10 displays various figures, images, characters, tables and the like. The external memory 11 which includes a hard disk (HD), a Floppy™ disk (FD) or the like stores a boot program, various application programs, font data, user files, editing files, a printer control command generation program (hereinafter called a printer driver), and the like.

The CPU 1, the RAM 2, the ROM 3, the KBC 5, the CRTC 6, the DKC 7 and the PRTC 8 are disposed on a computer control unit 2000 (FIG. 2) of the host computer 3000.

Next, the structure of the printer 1500 will be explained in detail. A CPU 12 is the central processing unit which totally controls respective devices connected to a system bus 15. The CPU 12 outputs an image signal to a print unit (printer engine) 17 as output information on the basis of a control program stored in a program ROM 13b (described later) of a ROM 13 or a control program stored in an external memory 14. Moreover, the CPU 12 can communication with the host computer 3000 through an input unit 18 so as to be able to notify the host computer 3000 of various kinds of information in the printer 1500.

A RAM 19 functions as a main memory, a working area and the like of the CPU 12. Incidentally, the RAM 19 is designed so that its memory capacity can be expanded by means of an optional RAM (not shown) connected to an expansion port. Moreover, the RAM 19 is used as an output information development (extraction) area, an environmental data storage area, an NVRAM (nonvolatile RAM), or the like. The ROM 13 includes a font ROM 13a, the program ROM 13b and a data ROM 13c. Here, the font ROM 13a stores font data or the like to be used in generating the output information, the program ROM 13b stores a control program of the CPU 12 or the like, and the data ROM 13c stores the information used on the host computer 3000 when the external memory 14 such as a hard disk or the like is not connected to the printer 1500.

The input unit 18 exchanges the data between the printer 1500 and the host computer 3000 through the bi-directional interface 21. A print unit I/F (interface) 16 exchanges the data between the CPU 12 and the print unit 17 through the system bus 15, an MC (memory controller) 20 controls accessing of the eternal memory 14, and the print unit 17 performs a print operation under the control of the CPU 12. An operation unit 1501 is equipped with various switches, a display (e.g., an LED) and the like for various kinds of operations.

The external memory 14 which includes a hard disk (HD), an IC card or the like is connected to the printer 1500 as an option. The external memory 14 stores the font data, an emulation program, form data and the like, and accessing of the external memory 14 is controlled by the MC 20. Here, it should be noted that plural external memories 14 may be provided and connected to the printer 1500. That is, an optional font card containing a font other than a built-in font, an external memory of storing a program for interpreting a printer control language of which language system is different from a built-in language system, and the like may be connected to the printer 1500. Moreover, an NVRAM (not shown) of storing printer mode setting information supplied from the operation unit 1501 may be connected.

The CPU 12, the RAM 19, the ROM 13, the input unit 18, the print unit I/F 16 and the MC 20 are disposed on a printer control unit (not shown) of the printer 1500.

Figure 2:
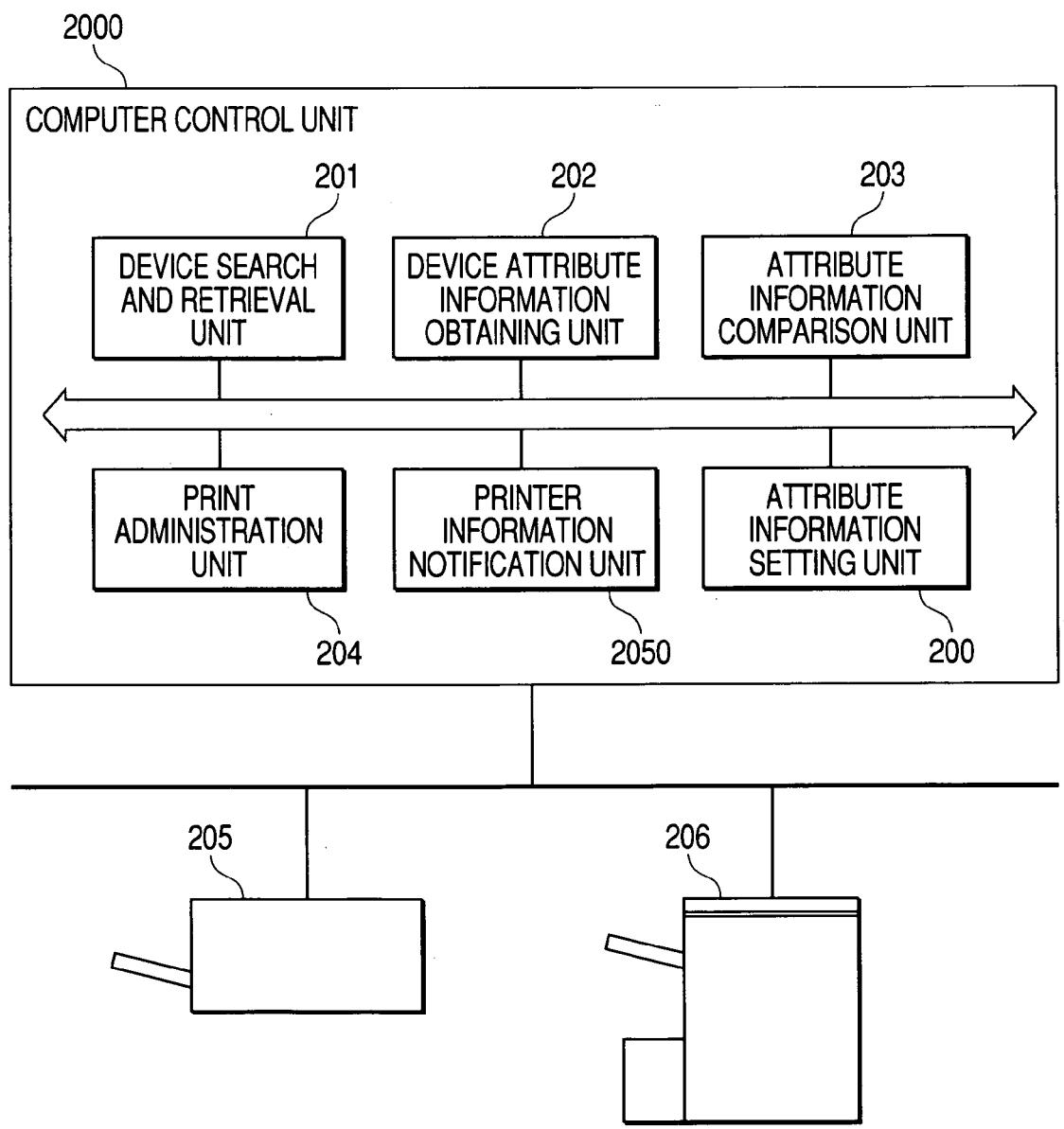
FIG. 2 is a block diagram showing the structure of a print system and the module structure of the host computer, according to the embodiment of the present invention.

FIG. 2 is a block diagram showing the structure of a print system and the module structure of the host computer 3000 to which print units (or printers) 205 and 206 or the like are connected directly or through a network. In FIG. 2, a printer attribute information setting unit 200, an device search and retrieval unit 201, an device attribute information obtaining unit 202, an attribute information comparison unit 203 and a print administration unit 204, a printer information notification unit 2050 which exist respectively as files stored on the external memory 11 of FIG. 1 are the program modules to be loaded to the RAM 2 and executed by the OS or a module which intends to use the program module in question.

In FIG. 2, numeral 2000 denotes the computer control unit of the host computer (terminal) 3000, which transmits print information consisting of the print data and the control codes to the input/output devices (printers) 205 and 206. Moreover, the computer control unit 2000 of the host computer (terminal) 3000 performs bi-directional communication to/from the printers 205 and 206, thereby obtaining printer attribute information from these printers.

The printer attribute information setting unit 200 beforehand sets a characteristic attribute (e.g., high-speed printing, color printing, double-sided printing, a model name or the like) that the user desires, on the RAM 2 of the computer control unit 2000 or the like. The device search and retrieval unit 201 obtains a connection-destination address for specifying the printer existing on the network or the like. Here, it should be noted that the connection-destination address includes address information for connecting the printer through an LPR (Line PRinter daemon protocol) port, a local port or the like. Further, it is possible to cause the user to easily input the connection-destination address or it is possible to automatize inputting of the address information, by means of a discovery function that uses a search protocol such as an LDAP (Light weight Directory Access Protocol), an SLP (Service Location Protocol) or the like, a broadcast address, or a response to a multicast address. The device attribute information obtaining unit 202 obtains the attributes which represent the capabilities of the printer. Here, it should be noted that the attributes include the high-speed printing, the color printing, the double-sided printing, the model name and the like. The attribute information comparison unit 203 compares the user's desired attribute set by the attribute-information setting unit 200 with the attribute obtained by the device attribute information obtaining unit 202 and representing the capability of the device. In a case where the user's desired printer is detected on the network as the result of the comparison by the attribute information comparison unit 203, the print administration unit 204 registers the connection-destination address of the printer in question.

In a case where the address of the printer administrated by the print administration unit 204 changes, the printer information notification unit 2050 notifies the user of such a change. Moreover, because it is hard for the user to know the output destination of the printed material only by using the connection-destination address, a device map, of displaying the respective positions of the devices on the network, based on printer administration software running in the host computer or the printer is displayed. Alternatively, setting location information of an SNMP (Simple Network Management Protocol) is displayed.

Then, a virtual printer setting process which is performed by the attribute information setting unit 200 and the print administration unit 204 in the print system having the above structure will be explained.

FIG. 3 is a diagram showing an UI (user interface) such as a printer setting screen to be displayed on the CRT 10 of the host computer.

In FIG. 3, numeral 301 denotes a list of the displayed printers which are currently registered, numeral 302 denotes printer names which have been set by the user, and numeral 303 denotes the IP (Internet Protocol) addresses which are registered in correspondence with the respective printer names 302.

On the UI shown in FIG. 3, four kinds of menu command buttons of "register", "edit", "delete" and "structure" are displayed. Hereinafter, the processes to be performed when these menu command buttons are respectively depressed by the user will be explained.

The "register" menu is used to register a new printer by the user. That is, when the user depresses the "register" button by using a pointing device or the like, a printer registration window shown in FIG. 4 is displayed, and a printer registration process is performed according to such a user instruction through this window.

In FIG. 4, numeral 401 denotes a window in which a printer name of the newly registered printer is displayed. For example, in FIG. 4, a name "double-sided print" is input and displayed. Besides, numeral 402 denotes printer attributes which are desired by the user. For example, in FIG. 4, attributes "double-sided print", "remaining paper amount 100" and "print speed 20 ppm" are input and displayed. However, it should be noted that other various printer attributes such as "paper size", "stapling function", "color print" and the like can be input. Moreover, if it is set to enable to input printer installation location information or the like, it is possible to designate the printer located nearby the user. Incidentally, the attribute "remaining paper amount 100" indicates that the user requires the printer of which the remaining paper amount is equal to or higher than 100 papers, and the attribute "print speed 20 ppm" indicates that the user requires the printer of which the print speed is equal to or higher than 20 ppm (20 papers printable per minute). In other words, in addition to the printer attributes such as "double-sided print being capable" and "color print being capable", the reference values (thresholds) such as "100 papers" and "20 ppm" can be set as the printer attributes. Thus, after the printer name and the printer attributes were input, when a "next" button is depressed by the user, a window shown in FIG. 5 is displayed.

FIG. 5 shows a printer attribute priority setting window which is used to designate or set priority order of the respective printer attributes 402. In FIG. 5, numeral 501 denotes a window in which the printer attribute 402 is displayed, and numeral 502 denotes a window to which the priority order is input by the user, thereby setting the priorities of the respective printer attributes.

In the example of FIG. 5, the printer attribute "double-sided print" is set to the first priority order, the printer attribute "print speed 20 ppm" is set to the second priority order, and the printer attribute "remaining paper amount 100" is set to the third priority order. Besides, when the printer capable of performing color printing and double-sided printing is required by the user, both the printer attributes "color print being capable" and "double-sided print being capable" can be set to the first priority order. Then, after the priority order was input, when a "retrieve" button 503 is depressed, the printers are retrieved in consideration of the printer attributes, the reference value and the priority order which are all designated by the user. Incidentally, such a retrieval process will be in detail explained later with reference to a flow chart shown in FIG. 7.

FIG. 6 shows a printer registration result display window which shows, as the result of the retrieval, the IP address of the printer newly created and registered on the screen shown in FIG. 4.

In FIG. 6, numeral 601 denotes a window in which the input printer name of the window 401 is displayed, and numeral 602 denotes a window in which the IP address of the printer satisfying the printer attribute designated by the user is displayed as the result of the retrieval. When an "OK" button 603 is depressed by the user, the printer of an IP address "123.123.4.5" displayed in the window 602 is registered as the "double-sided print" printer newly set in the window 401. Moreover, when a pull-down button 604 is depressed, it is possible to display another IP address satisfying the printer attribute. It should be noted that the IP addresses to be displayed here are actually displayed in the order determined in consideration of the priorities set by the user, and the printer of the first priority order is initially displayed in the window 602.

Subsequently, the printer registration process will be explained.

Figure 7:
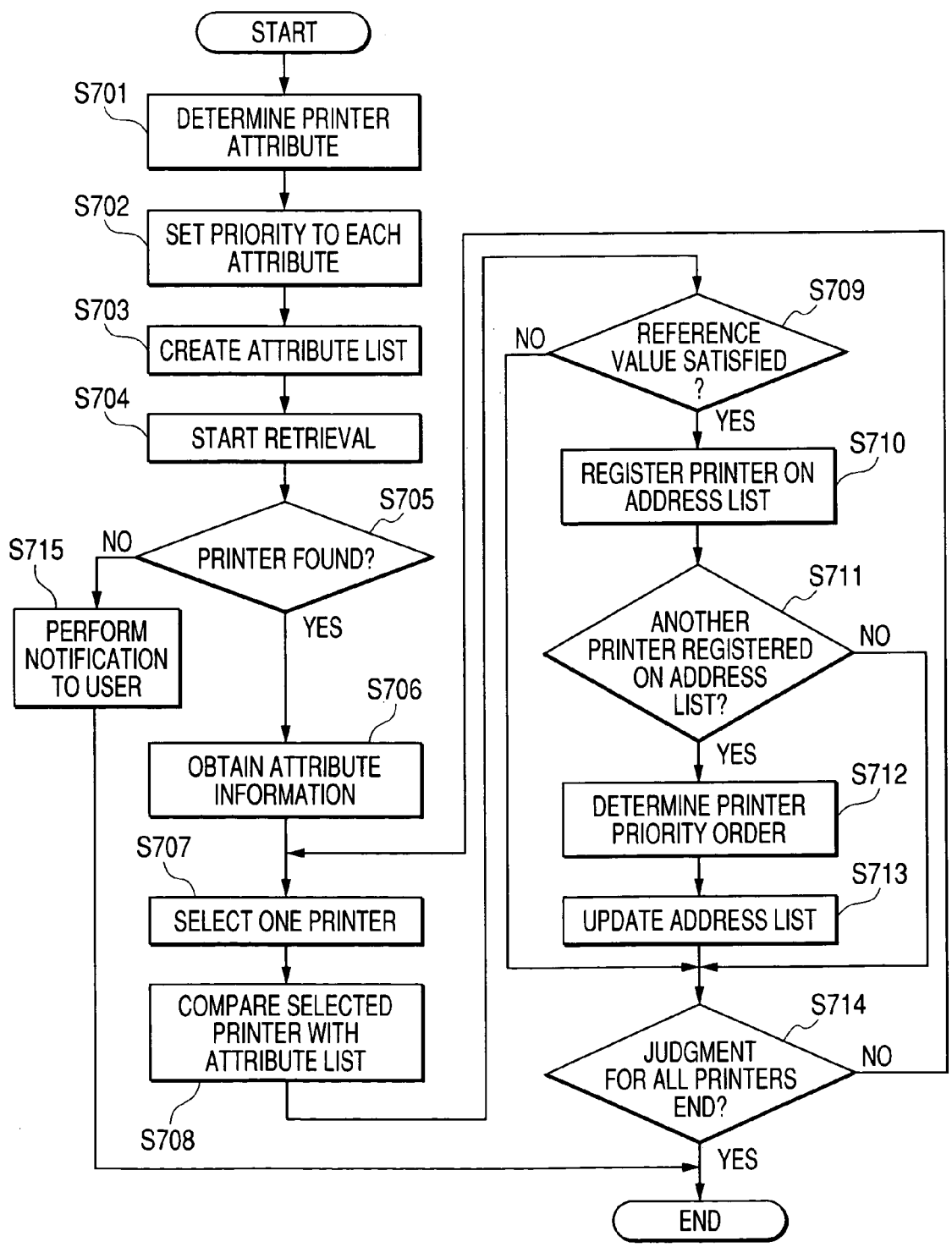
FIG. 7 is a flow chart showing a printer registration process according to the embodiment of the present invention.

FIG. 7 is a flow chart showing the printer registration process in the print system according to the embodiment.

Initially, in a step S701, the printer name and the printer attributes are input by the user through the UI shown in FIG. 4. Here, it should be noted that the reference value of the printer attribute can be set according to need. Then, in a step S702, the priority order is input with respect to the respective printer attributes through the UI shown in FIG. 5, and, in a step S703, printer attribute lists are created by the attribute information setting unit 200 on the basis of the printer name, the printer attributes, the reference value and the priority order input by the user in the steps S701 and S702. FIGS. 8A, 8B and 8C respectively show the created printer attribute lists.

More specifically, FIG. 8A shows an example of the printer attribute list which is created according to the user's designations of the printer name, the printer attributes and the priority order as in FIGS. 4 and 5 and then stored in the RAM 2 or the like of the host computer. In the drawing, the printer name "double-sided print" set by the user is shown in a section 801, the printer attributes "double-sided print", "print speed" and "remaining paper amount" set by the user are shown in a section 802, and the priority and the reference value are shown with respect to each printer attribute.

Likewise, FIGS. 8B and 8C respectively show examples of the printer attribute lists "A3 double-sided print" and "color 4 up" which are created by the user when setting such printers.

When the printer attribute lists are created by the attribute information setting unit 200 as above, the printer attribute information setting process ends, and the flow advances to a step S704.

In the step S704, a resident service program (retrieval thread) is started on the background of the host computer in response to a user's instruction. Such retrieval can be also started in response to event driving by events such as polling, printing or the like by the device search and retrieval unit 201. Here, even when a user's instruction is issued instead of the resident service program, the following operation can be achieved likewise. Besides, in case of the printer retrieval, protocols such as the LDAP, a response of broadcast and the like can be used.

Subsequently, it is judged in a step S705 whether or not one or more printers are found on the network as the result of the printer retrieval. When judged in the step S705 that one or more printers are found, the flow advances to a step S706. On the contrary, when judged in the step S705 that no printer is found, the flow advances to a step S715 to notify the user of such a fact, and then the process ends.

In the step S706, with respect to each of the printers found in the printer retrieval process, the printer attribute information is obtained by the device attribute information obtaining unit 202. Here, it should be noted that the printer attribute information is actually obtained by using the protocol such as the SNMP or the like.

Then, in a step S707, an arbitrary one of the plural printers found in the printer retrieval process is selected, and in a step S708, the printer attribute information obtained with respect to the selected printer is compared with the printer attribute lists shown in FIGS. 8A to 8C by the attribute information comparison unit 203. Then, the flow advances to a step S709 to judge whether or not, as the result of the comparison, the printer which satisfies the printer attributes and the reference value set by the user exists. When judged that the printer satisfying the attributes and the reference value exists, the flow advances to a step S710 to register it in a printer address list which will be later described with reference to FIG. 9. On the other hand, when judged in the step S709 that the printer satisfying the attributes and the reference value does not exist, the judged printer is not registered in the printer address list, and the flow advances to a step S714. In the step S714, it is judged whether or not the printer attribute information has been compared with the printer attribute lists with respect to all the selected printers. When YES in the step S714, the process ends. On the contrary, when judged that the printer of which the attribute information is not yet compared with the printer attribute lists exists, the flow returns to the step S707.

FIG. 9 shows an example of the printer address list which is disposed in the RAM 2 or the like of the host computer and administrated by the print administration unit 204. In the printer address list, the addresses of the respective printers satisfying the printer attribute conditions set by the user are administrated together with the corresponding priority order.

In FIG. 9, a row 901 shows an example of the address list in a case where the printer attributes and the priority order shown in FIGS. 4 and 5 are respectively set. More specifically, the name of the printer set by the user is written in a section (column) 902, the priority order set in consideration of the priorities by the user is written in a section (column) 903, the IP addresses corresponding to the priority order and satisfying the printer attributes set by the user are written in a section (column) 904, and the attributes of the printer are written in sections (columns) 905. In the example of FIG. 9, the three printers satisfying the printer attributes set by the user can be found. Besides, it can be understood that the shown priority order is determined according to differences of "print speed" capability of which the priority set by the user is high. Likewise, rows 906 and 907 respectively show examples of the address lists which are registered in correspondence with the attribute lists shown in FIGS. 8B and 8C. The host computer administrates the address list of the printers in such a way. The printer of the IP address "123.123.4.5" corresponding to the first priority order is displayed in the address window 602 of FIG. 6.

In the step S710, when the printer satisfying the printer attributes set by the user is newly registered in the printer address list, the flow advances to a step S711 to judge whether or not a printer, other than the newly registered printer, satisfying the printer attributes has been registered in the address list. When judged that the printer other than the newly registered printer has been registered, the flow advances to a step S712 to determine the priority order of the registered printers on the basis of the priorities of the printer attributes set by the user. For example, in the case where the "double-sided print" printer is registered as shown in the row 901 of FIG. 9, when the "double-sided print being capable, print speed 50 ppm, and the remaining paper amount 400" printer is newly retrieved and found, the following process is performed. That is, with respect to the printer attribute "double-sided print" of which the priority order set by the user is the first, the newly found printer is compared with the already registered three printers. As the result of the comparison, it is judged that all the registered printers are capable of performing the double-sided printing. Then, with respect to the printer attribute "print speed" of which the priority order is the second, the newly found printer is compared with the already registered three printers. As the result of the comparison, it is judged that the print speed of the newly found printer is the same as that of the printer of which the IP address is "123.123.4.6". Then, with respect to the printer attribute "remaining paper amount" of which the priority order is the third, the newly found printer is compared with the printer of "123.123.4.6". As the result, it is determined that the priority order of the newly found printer is the third, whereby the printers registered as the "double-sided print" printers are ranked according to the priority order of the printer of "123.123.4.5", the printer of "123.123.4.6", the newly found printer, and the printer of "123.123.4.7". Because the above process is performed in the step S712, the printer priority order in which the priority order of the printer attributes set by the user is reflected are determined in the address list.

After then, the flow advances to a step S713 to update the address list, and further advances to the step S714 to judge whether or not the comparison of the attributes ends with respect to all the printers found in the printer retrieval. When judged that the comparison ends, the printer registration process ends.

Next, a printer editing process which is performed when the "edit" menu in the menu commands shown in FIG. 3 is selected will be explained.

The user can edit, at desired timing, the printers already registered. The reason why the user edits the printers is to cope with addition of the attributes of a new printer, deletion of the registered printer attributes, a change of the priority order, a change of the reference value, and the like. Incidentally, for example, in a case where the attribute such as "remaining paper amount" or the like which changes moment by moment is registered as the printer attribute, even when re-retrieval is performed without changing any attribute, any priority order and the like, it is expected that the retrieval result undesirously changes. Moreover, for example, in a case where the printer connected to the network when it was registered is released therefrom for some reason, it is possible to cope with such a situation by editing the printers.

In FIG. 3, when any one of the printers displayed in the list 301 is selected and the menu command button "edit" is depressed by the user with use of a pointer device or the like, a printer editing window shown in FIG. 10 is displayed.

Here, FIG. 10 shows an example of the editing screen to be displayed in a case where the "double-sided print" printer for which the address list has been registered as indicated in the row 901 of FIG. 9 as the result of the user's settings as in FIGS. 4 and 5.

More specifically, in FIG. 10, the window which is similar to the printer registration window shown in FIG. 4 is displayed, whereby the user can change the printer name and the printer attributes. Then, when a "next" button (shown as an "OK" button in FIG. 10) is depressed, a window shown in FIG. 11 is displayed, whereby the user can designate and change the priority order with respect to the printer attributes set in the window of FIG. 10.

Figure 12:
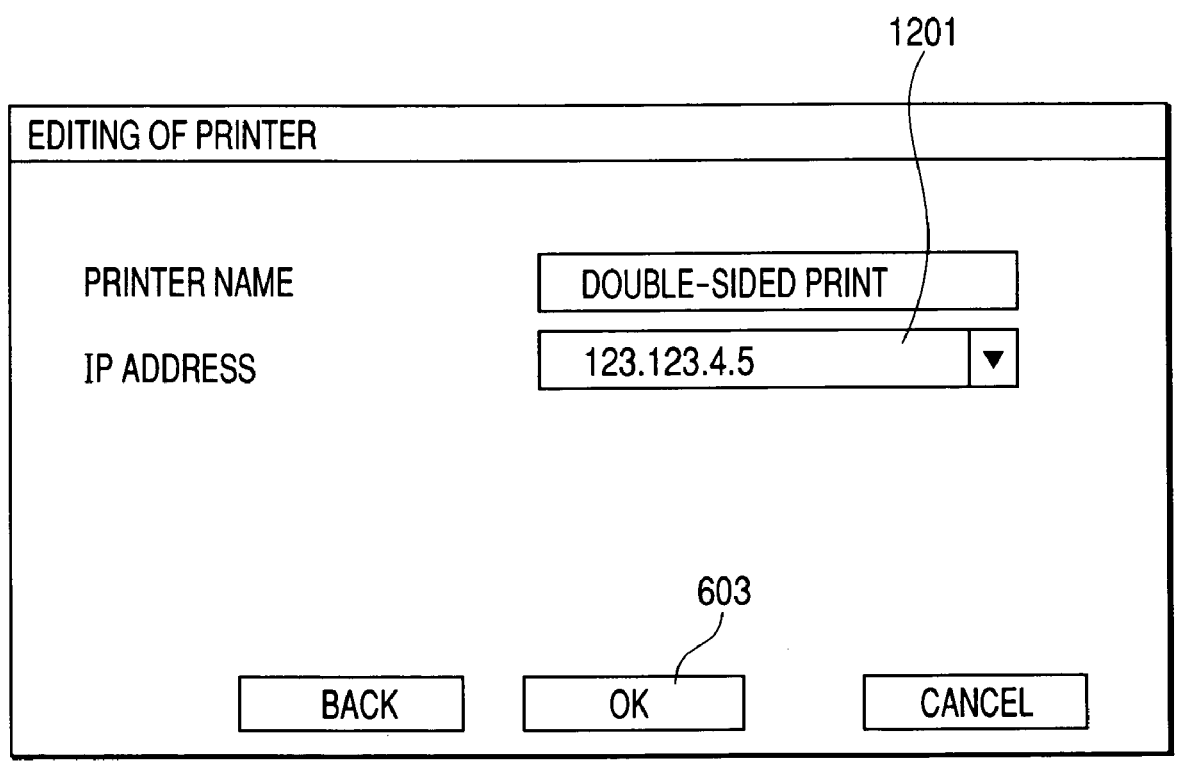
FIG. 12 is a diagram showing an example of a printer editing result display window to be displayed on the display of the host computer according to the embodiment of the present invention.

After then, when a "retrieval" button is depressed, the printer editing process is performed, and the window of FIG. 12 is resultingly displayed. At that time, when the address list is changed according to the edited content, the IP address of the printer of the first priority order is newly displayed in a section 1201.

Figures 13, 13A:
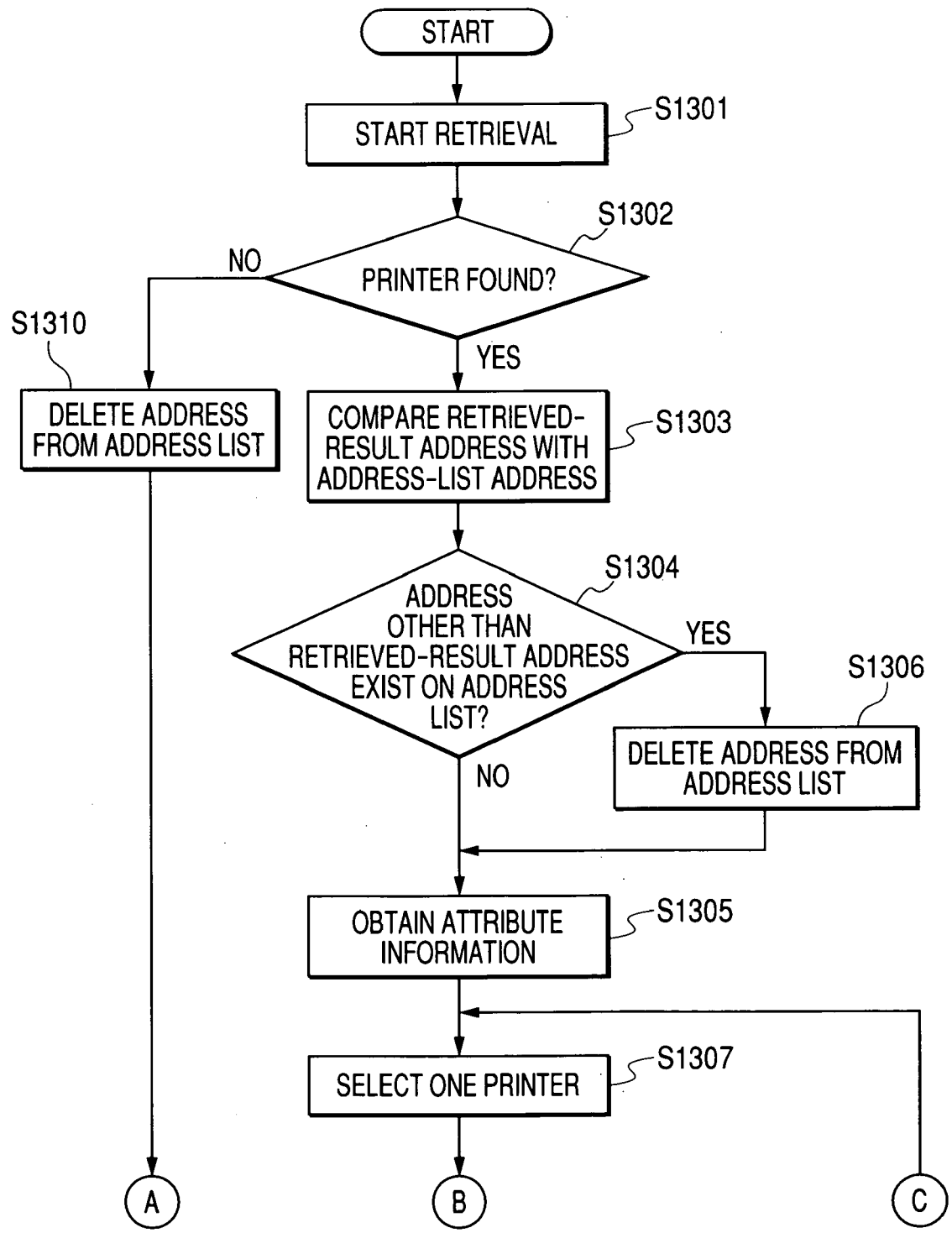
FIG. 13 which is composed of FIGS. 13A and 13B is a flow chart showing a printer editing process according to the embodiment of the present invention.
Figure 13B:
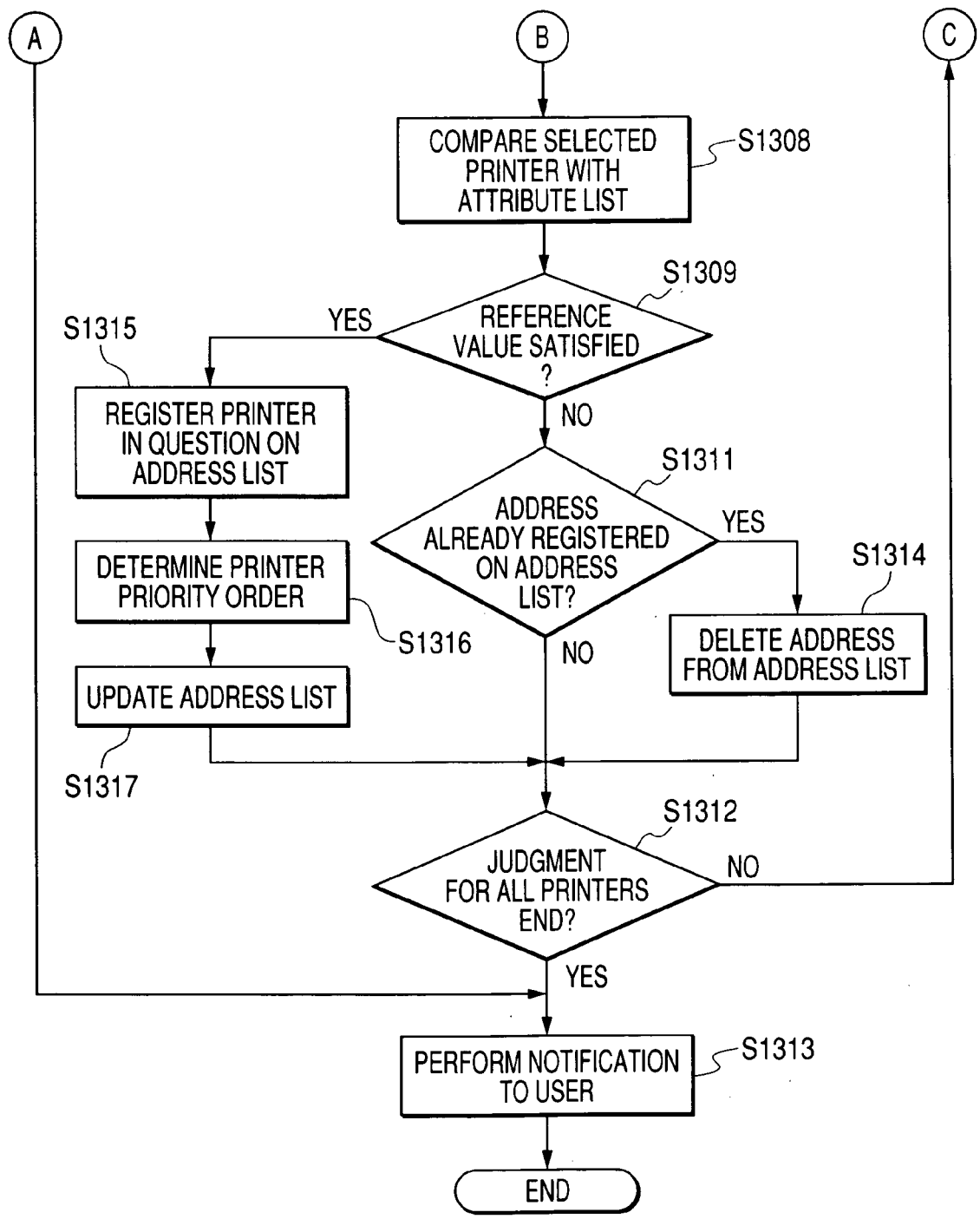

Next, the printer editing process will be explained with reference to a flow chart shown in FIG. 13 composed of FIGS. 13A and 13B.

Initially, the printer on the network is retrieved in a step S1301, and it is then judged in a step S1302 whether or not the printer is found. Then, the flow advances to a step S1303 when the printer is found, while the flow advances to a step S1310 when the printer is not found. In the step S1310, the already-registered IP address is deleted from the printer address list of the printer which is currently edited. Then, the flow advances to a step S1313 to notify the user that the address list has been changed, and the process ends.

When it is judged in the step S1302 that the printer is found, the flow advances to the step S1303. In the step S1303, the address of the printer found as the result of the retrieval is obtained, and the obtained address is compared with the addresses already registered in the address list, and the flow further advances to a step S1304. In the step S1304, when the address other than the address obtained as the result of the retrieval is found in the printer address list in the step S1304, the flow advances to a step S1306 to delete the address in question from the printer address list. That is, for example, it is believed in this case that the printer formerly connected to the network is removed therefrom for some reason, or the printer power supply is being turned off at present. Thus, the address of the printer being in such a state is deleted from the address list. On one hand, when the address other than the obtained address is not found in the printer address list in the step S1304, the flow advances to a step S1305 to obtain the printer attribute information of the printers found as the result of the retrieval. Subsequently, in a step S1307, one arbitrary printer is selected from among the plural printers found as the result of the retrieval, and the flow further advances to a step S1308. In the step S1308, the attribute list created based on the printer attributes and the priority order respectively set by the user on the windows shown in FIGS. 10 and 11 is compared with the printer attributes of the printer selected in the step S1307.

Subsequently, it is judged in a step S1309 whether or not the selected printer satisfies the printer attribute information of the attribute list. When it is judged that the selected printer satisfies the printer attribute information of the attribute list, the flow advances to a step S1315 to register the address of the printer in question in the address list, the flow advances to a step S1316 to determine the priority order in the address list, and the flow further advances to a step S1317 to update the address list. After then, the flow advances to a step S1312 to judge whether or not the judgment ends for all the printer found as the result of the retrieval.

On one hand, when it is judged in the step S1309 that the selected printer does not satisfy the printer attribute information, the flow advances to a step S1311. In the step S1311, it is judged whether or not the printer judged in the step S1309 not to satisfy the printer attribute information has been registered in the address list. When judged that the printer in question has been registered in the address list, the flow advances to a step S1314 to delete the registered printer from the address list. On the contrary, when judged that the printer in question is not registered, or when the deletion of the printer in question from the address list ends, the flow advances to the step S1312 to judge whether or not the comparison of the attribute information ends for all the printers found as the result of the retrieval. In other words, the above process is repeated until the comparison ends for all the printers. Then, when the process for all the printers found as the result of the retrieval ends, the flow advances to the step S1313 to notify the user that the address list is changed (or the address list is not changed), and the printer editing process ends.

Next, the "delete" menu in the printer setting window of FIG. 3 will be explained.

It should be noted that the "delete" menu is used to delete the printer already registered. That is, when the user selects any one of the printers displayed in the list 301 by using the pointing device or the like and then depresses the "delete" button, the selected printer is deleted from the list 301, and the respective items administrated in the address list are deleted dependently.

Next, the "structure" menu in the printer setting window of FIG. 3 will be explained.

It should be noted that the "structure" menu is used when the user wishes to refer the structure of the printer already registered. That is, when the user selects any one of the printers displayed in the list 301 by using the pointing device or the like and then depresses the "structure" button, a printer structure information window of the selected printer is displayed.

Figure 14:
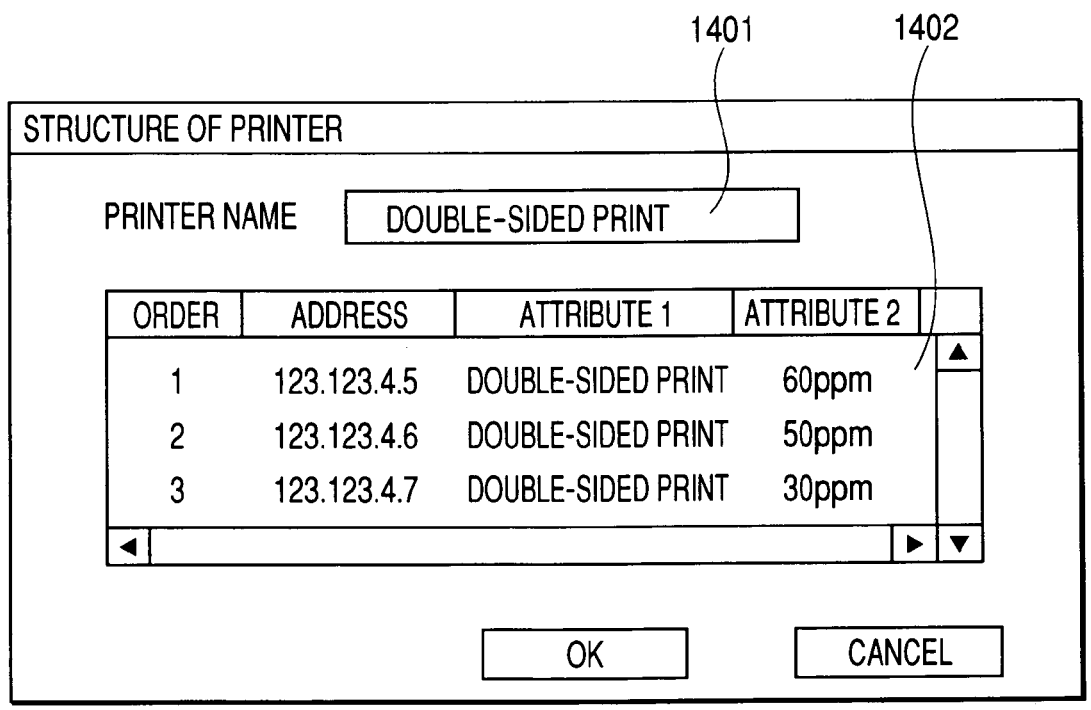
FIG. 14 is a diagram showing an example of a printer structure information window to be displayed on the display of the host computer according to the embodiment of the present invention.

FIG. 14 shows an example of the printer structure information window to be displayed when the double-sided printing is selected in the list 301 of FIG. 3. In FIG. 14, the printer name is displayed in a section 1401, and the information of the printers already registered in the address list is displayed in a section 1402. Thus, the user can know the addresses, the attribute information, the priority order and the like with respect to the plural printers registered as the double-sided print printers.

As explained above, in the embodiment, the printer address list is registered and edited in response to the user's instructions. However, for example, in the case where the printer attribute such as "remaining paper amount" or the like which changes moment by moment is designated as the attribute condition, it is expected that the priority order changes every time the printer address list is edited. To cope with such a situation, the host computer may automatically update at predetermined timing the printer address list of the printers which had been once instructed by the user to be registered and to which the registration process has ended. In that case, the user may set the predetermined timing (for example, one update process per minute). Beside, by constantly observing the respective printers, the host computer may automatically update the address list according to a change of the remaining paper amount or the like. By doing so, even if the user does not especially consider, the address list can always correspond to a current state.

Subsequently, a substitute print process which is performed in the print system according to the embodiment will be explained as an example of the print process in which the registered printer is used.

Figure 15:
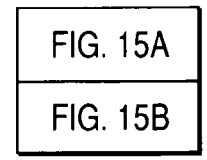
FIG. 15 which is composed of FIGS. 15A and 15B is a flow chart showing a substitute print process according to the embodiment of the present invention.
Figure 15A:
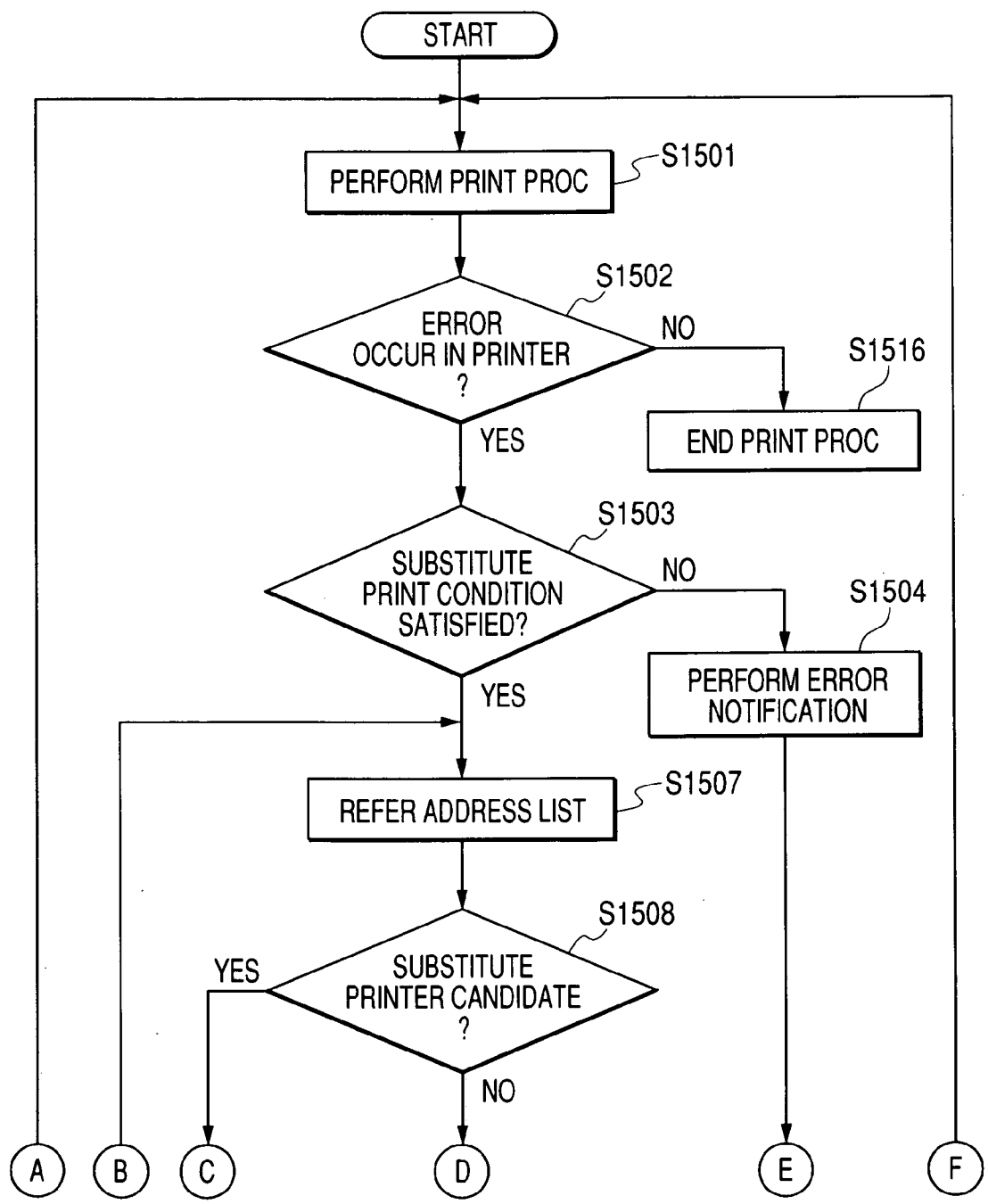
Figure 15B:
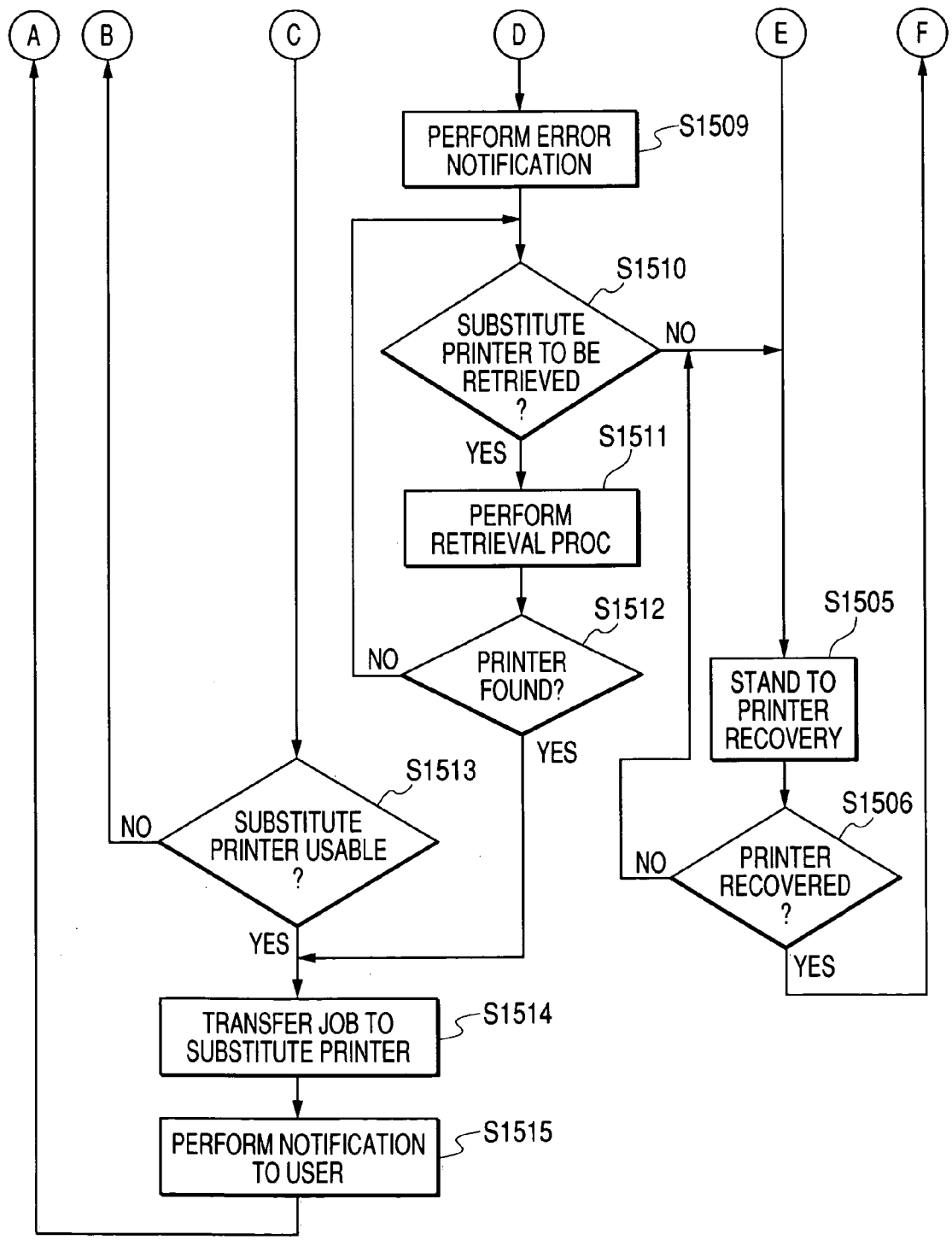

FIG. 15 which is composed of FIGS. 15A and 15B is a flow chart showing the substitute print process in the print system according to the embodiment of the present invention.

In FIG. 15, in a step S1501, the printing is being performed (or executed) by the printer selected by the user from the currently registered printers. Then, when it is judged in a step S1502 that some kind or another trouble or error occurs in the printer and thus the printer in question is in a non-printable state, the flow advances to a step S1503. For example, the non-printable state includes an error state of the printer itself (e.g., a paper jam, etc.), a paper empty state, a toner empty state, a state that the power supply of the printer has been turned off due to some kind or another reason, and the like. In the step S1503, it is judged whether or not a substitute print condition previously set by the user is satisfied. More specifically, in this step, a "substitute print condition" button 1601 is provided on the "structure" window for the registered printer as shown in FIG. 16, and a substitute print condition setting window shown in FIG. 17 is displayed when the button 1601 is depressed. FIG. 17 shows some error states of the printer. In a default state, it has been set to perform the substitute printing in all of the shown states (that is, all the shown check boxes are checked). Consequently, the user can set, by releasing the check from the corresponding check box, the error state for which the substitute printing is unnecessary. Here, it should be noted that the substitute print conditions may include other items concerning, e.g., toner empty, power off, etc. Incidentally, when it is judged in the step S1502 that any trouble or error does not occur in the printer and thus the printer in question is in a printable state, the flow advances to a step S1516 to continue and end the print process.

As described above, it is judged in the step S1503 whether or not the substitute print condition previously set is satisfied. Then, the flow advances to a step S1507 when judged that the substitute print condition is satisfied, while the flow advances to a step S1504 when judged that the substitute print condition is not satisfied. When the substitute print condition is not satisfied, the fact that the trouble or error occurs in the printer is notified to the user in the step S1504, and the flow advances to a step S1505 to stand to until the printer is recovered. Then, the flow advances to a step S1506 to judge whether or not the printer is recovered. When judged that the printer is recovered, the flow returns to the step S1501 to again continue the print process.

When judged in the step S1503 that the substitute print condition previously set is satisfied, the flow advances to the step S1507 to refer the printer address list to find an appropriate substitute printer. Then, it is judged in a step S1508 whether or not a candidate for the substitute printer is found in the printer address list. When judged that the candidate is found in the printer address list, the flow advances to a step S1513 to judge whether or not the found substitute printer is currently in a usable state. When judged that the found substitute printer is currently in the usable state, the flow advances to a step S1514 to transfer a print job to the printer in question. Then, the flow further advances to a step S1515 to notify the user of the execution of the substitute printing and the printer information used in the substitute printing, and the flow returns to the step S1501. In the meantime, when judged in the step S1513 that the found substitute printer is in an error state and thus cannot be used at present, the flow returns to the step S1507 to again refer the address list to find a next candidate for the substitute printer (i.e., the printer registered as a next-priority printer).

When judged in the step S1508 that the candidate for the substitute printer is not found in the printer address list, the flow advances to a step S1509 to notify the user of such a fact. Then, the flow advances to a step S1510 to inquire of the user whether or not to retrieve the substitute printer through a UI shown in FIG. 18. When judged that there is no instruction for the retrieval from the user, the flow advances to the step S1505 to stand to until the printer is recovered. On the contrary, when judged in the step S1510 that there is an instruction for the retrieval from the user, the flow advances to a step S1511 to perform the retrieval process. In the retrieval process, the "edit" window shown in FIG. 10 is displayed with respect to the currently used printer, whereby the user can perform the printer editing process based on the set printer attributes and priority order. Then, it is judged in a step S1512 whether or not the printer capable of acting as the substitute printer is found. When judged that the substitute printer is found, the flow advances to the step S1514 to transfer the print job to the found substitute printer. In the meantime, when judged in the step S1512 that the substitute printer is not found, the flow returns to the step S1510 to inquire of the user whether or not to further retrieve the substitute printer.

As described above, in the substitute print process, according to the embodiment of the present invention, to be performed when a printer error or trouble occurs, because it causes the printer registered in the address list to perform the substitute printing, it is possible to save a trouble that the user has to perform the retrieval to find a substitute printer every time some kind or another error occurs in the currently used printer. In addition, even if the substitute printing is not instructed beforehand, it is possible to automatically perform the substitute printing.

In the embodiment of the present invention, at least one or more printers satisfying the predetermined attributes are administrated with respect to one printer name in the printer address list, and ordinarily the printer of the first priority order is used. Incidentally, as an example of the printing to be performed in the case where the printer of the second or following priority order is used, the substitute printing is described in the embodiment. Therefore, a post-process of the address list to be performed after the substitute printing was performed will be explained with reference to a flow chart shown in FIG. 19. Here, it should be noted that the post-process is the process which is necessary when the printer of the second or following priority order is used as the substitute printer.

When the print process ends, it is judged in a step S1901 whether or not the substitute printer is used. When judged that the substitute printer is used, the flow advances to a step S1902 to update the address list. For example, it is assumed that the printing is performed by using the "double-sided print" printer set in the section 801 of FIG. 8A. Here, in such a case where an error occurs in the printer of "123.123.4.5" having the first priority order and thus the substitute printing is performed by the printer of "123.123.4.6" having the second priority order, the conventional address list is updated so that the printer of "123.123.4.6" has the first priority order and the printer of "123.123.4.7" has the second priority order. Thus, the printing by the "double-sided print" printer is performed based on such a new address list. Besides, if it is set to again update the address list after elapsing a predetermined period of time, in response to recovery of the printer in which the error occurred, or in accordance with a user's instruction, then it is possible to return the current address list to the conventional address list or default. By doing so, for example, even when print jobs are continuously transmitted to the "double-sided print" printer, it is possible to eliminate a useless operation that various data have to be transferred to the error-occurred printer every time the process of each print job is performed.

In any case, when the update of the address list ends, the flow advances to a step S1903 to notify the user of the updated content, whereby the user can know that the address list has been changed.

When judged in the step S1901 that a substitute printer is not specifically used, the flow advances to a step S1904 to end the process without updating the address list.

As another example of use of the address list, there is distribution printing that one print job is processed by using plural printers. In this case, it is necessary to designate the distribution printing when the user actually instructs to perform the printing. Moreover, in case of setting a distribution ratio with respect to the distribution printing, it is necessary for the user to depress a "distribution ratio" button 2001 provided in the printer structure window shown in FIG. 20. That is, when the "distribution ratio" button 2001 is depressed by the user, a distribution ratio setting window shown in FIG. 21 is displayed so as to enable the user to set the distribution ratio. More specifically, in the case where the printer is designated and thus the printing is performed, if the user designates the distribution printing, the distribution printing is performed, at the set distribution ratio, by the plural printers registered with respect to the designated printer name in the address list.

It is needless to say that the object of the present invention can be achieved by supplying a recording medium (or a storage medium) recording thereon program codes of software to realize the functions of the above embodiment to a system or an apparatus, and causing a computer (CPU or MPU) in the system or the apparatus to read and execute the program codes stored in the recording medium. In this case, the program codes themselves read out of the recording medium realize the functions of the above embodiment. Therefore, the recording medium storing these program codes constitutes the present invention. As the recording medium from which the program codes are supplied, e.g., a floppy disk, a hard disk, an optical disk, a magneto-optical disk, a CD-ROM, a CD-R, a magnetic tape, a non-volatile memory card, a ROM or the like can be used.

Further, it is needless to say that the present invention includes not only a case where the functions of the above embodiment are realized by executing the program codes read by the computer, but also a case where an OS (operating system) or the like running on the computer performs a part or all of the actual processes on the basis of instructions of the program codes and thus the functions of the above embodiment are realized by such the processes.

Furthermore, it is needless to say that the present invention also includes a case where, after the program codes read out of the storage medium are written into a function expansion board inserted in the computer or a memory in a function expansion unit connected to the computer, a CPU or the like provided in the function expansion board or the function expansion unit performs a part or all of the actual processes on the basis of the instructions of the program codes, and thus the functions of the above embodiment are realized by such the processes.

As many apparently widely different embodiments of the present invention can be made without departing from the spirit and scope thereof, it is to be understood that the present invention is not limited to the specific embodiments thereof expect as defined in the appended claims.

This application claims priority from Japanese Patent Application No. 2003-353745 filed Oct. 14, 2003, which is hereby incorporated by reference herein.

What is claimed is:

1. An information processing apparatus which can communicate with plural image processing apparatuses, comprising:
   a determination unit adapted to determine a priority order of each of the plural image processing apparatuses;
   a first selection unit adapted to select, from among the plural image processing apparatuses, a first image processing apparatus of which the priority order determined by said determination unit is high, as the image processing apparatus for executing a first process;
   a second selection unit, in a case where the first image processing apparatus selected by said first selection unit cannot continue to execute the first process, adapted to select a second image processing apparatus of which the priority order is high next to that of the first image processing apparatus, as the image processing apparatus for substitutively executing the first process; and
   a change unit adapted to make the priority order of the second image processing apparatus higher than that of the first image processing apparatus according to the completion of the first process by said second image processing apparatus.

2. An information processing apparatus according to claim 1, wherein said change unit lowers the priority order of the first image processing apparatus selected by said first selection unit.

3. An information processing apparatus according to claim 1, further comprising:
   an input unit adapted to cause a user to input a desired condition;
   a search unit adapted to search the image processing apparatus which satisfies the condition input by said input unit; and
   a storage unit adapted to store information of the plural image processing apparatuses searched by said search unit, so that the plural image processing apparatuses stored are associated with others,
   wherein said second selection unit selects the second image processing apparatus stored in association with the first image processing apparatus selected by said first selection unit.

4. An information processing apparatus according to claim 3, further comprising:
   a setting unit adapted to set priority for the condition input by said input unit,
   wherein said determination unit determines the priority order of the plural image processing apparatuses based on the priority set by said setting unit.

5. An information processing apparatus according to claim 1, wherein, in a case where a predetermined period of time elapses after the priority order was changed or in a case where the first image processing apparatus which could not continue to execute the process is restored, said change unit heightens the priority order of the first image processing apparatus.

6. A control method for an information processing apparatus which can communicate with plural image processing apparatuses, said method comprising:
   a determination step of determining a priority order of each of the plural image processing apparatuses;
   a first selection step of selecting, from among the plural image processing apparatuses, a first image processing apparatus of which the priority order determined in said determination step is high, as the image processing apparatus for executing a first process;
   a second selection step of, in a case where the first image processing apparatus selected in said first selection step cannot continue to execute the first process, selecting a second image processing apparatus of which the priority order is high next to that of the first image processing apparatus, as the image processing apparatus for substitutively executing the first process; and
   a change step of making the priority order of the second image processing apparatus higher than that of the first image processing apparatus according to the completion of the first process by the second image processing apparatus.

7. A program embodied on a computer-readable medium for causing a computer to execute a control method for an information processing apparatus capable of communicating with plural image processing apparatuses, said method comprising:

a determination step of determining a priority order of each of the plural image processing apparatuses;

a first selection step of selecting, from among the plural image processing apparatuses, a first image processing apparatus of which the priority order determined in said determination step is high, as the image processing apparatus for executing a first process;

a second selection step of, in a case where the first image processing apparatus selected in said first selection step cannot continue to execute the first process, selecting a second image processing apparatus of which the priority order is high next to that of the first image processing apparatus, as the processing apparatus for substitutively executing the first process; and a change step of making the priority order of the second image processing apparatus higher than that of the first image processing apparatus according to the completion of the first process by the second image processing apparatus.

* * * * *

UNITED STATES PATENT AND TRADEMARK OFFICE
CERTIFICATE OF CORRECTION

PATENT NO. : 7,158,257 B2
APPLICATION NO. : 10/960114
DATED : January 2, 2007
INVENTOR(S) : Yasuhiro Hosoda It is certified that error appears in the above-identified patent and that said Letters Patent is hereby corrected as shown below:

COLUMN 1:

Line 29, "technique that" should read --technique by which--;
Line 34, "troublesome that" should read --troublesome step in which--; and
Line 42, "occurred" should read --occurring--.

COLUMN 2:

Line 1, "are used" should read --use--;
Line 18, "that" should read --in which--; and
Line 25, "therefore," should read --therefor,--.

COLUMN 3:

Line 22, "in case" should read --in the case--.

COLUMN 4:

Line 37, "in case" should read --in the case--.

COLUMN 5:

Line 12, "can communication" should read --can communicate--; and
Line 50, "of which" should read --whose--.

COLUMN 8:

Line 53, "in case" should read --in the case--.

COLUMN 10:

Line 43, "undesirously changes" should read --changes undesirably--.

COLUMN 11:

Line 51, "call the printer" should read --all the printers--.

COLUMN 12:

Line 45, "Beside," should read --Besides,--.

UNITED STATES PATENT AND TRADEMARK OFFICE
CERTIFICATE OF CORRECTION

PATENT NO. : 7,158,257 B2
APPLICATION NO. : 10/960114
DATED : January 2, 2007
INVENTOR(S) : Yasuhiro Hosoda It is certified that error appears in the above-identified patent and that said Letters Patent is hereby corrected as shown below:

COLUMN 14:

Line 15, "to save a trouble" should read --to avoid the problem--; and
Line 67, "that one" should read --whereby one--.

COLUMN 15:

Line 3, "in case" should read --in the case--;
Line 38, "such the" should read --such--;
Line 48, "such the" should read --such--; and
Line 53, "expect" should read --except--.

Signed and Sealed this

Eighth Day of April, 2008

JON W. DUDAS
*Director of the United States Patent and Trademark Office*